(12) United States Patent
Daecke

(10) Patent No.: US 8,942,281 B2
(45) Date of Patent: Jan. 27, 2015

(54) METHOD FOR PROCESSING SIGNALS

(75) Inventor: Dirk Daecke, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 22 days.

(21) Appl. No.: 13/450,954

(22) Filed: Apr. 19, 2012

(65) Prior Publication Data

US 2012/0269253 A1 Oct. 25, 2012

(30) Foreign Application Priority Data

Apr. 21, 2011 (DE) .......................... 10 2011 007 846

(51) Int. Cl.
*H03H 7/30* (2006.01)
*H04B 3/14* (2006.01)
*H04L 25/03* (2006.01)

(52) U.S. Cl.
CPC ............ *H04B 3/14* (2013.01); *H04L 25/03878* (2013.01)
USPC ............ 375/232; 370/208; 370/362; 375/259

(58) Field of Classification Search
USPC .................. 375/229, 232, 233, 301, 316, 350
See application file for complete search history.

(56) References Cited

U.S. PATENT DOCUMENTS

| | | | |
|---|---|---|---|
| 6,512,737 B1* | 1/2003 | Agee | 370/208 |
| 7,546,042 B2* | 6/2009 | Lenosky et al. | 398/208 |
| 2001/0055301 A1* | 12/2001 | Hogeboom | 370/362 |
| 2003/0228005 A1* | 12/2003 | Melick et al. | 379/93.01 |
| 2006/0002462 A1* | 1/2006 | Park | 375/232 |
| 2006/0132953 A1* | 6/2006 | Asakura et al. | 360/48 |
| 2010/0091830 A1* | 4/2010 | Li et al. | 375/231 |
| 2010/0103999 A1* | 4/2010 | Leibowitz et al. | 375/233 |
| 2011/0069749 A1* | 3/2011 | Forrester et al. | 375/232 |
| 2012/0027072 A1* | 2/2012 | Brahma et al. | 375/232 |
| 2012/0027073 A1* | 2/2012 | Abel et al. | 375/233 |

* cited by examiner

*Primary Examiner* — Leon-Viet Nguyen
(74) *Attorney, Agent, or Firm* — Kenyon & Kenyon LLP

(57) ABSTRACT

A method for processing signals transmitted via a connection and received by a digital interface, where individual data frames are transmitted by the signals as a sequence of modulated symbols, and where the received signals are corrected by an equalizer; the equalizer sampling the received signals, and an adaptation of the equalizer only taking place in particular time intervals in a manner controlled by a protocol.

15 Claims, 14 Drawing Sheets

METHOD FOR PROCESSING SIGNALS

RELATED APPLICATION INFORMATION

The present application claims priority to and the benefit of German patent application no. 10 2011 007 846.0, which was filed in Germany on Apr. 21, 2011, the disclosure of which is incorporated herein by reference.

FIELD OF THE INVENTION

The present invention relates to a method for processing signals transmitted via a connection and received by a digital interface, as well as to such a digital interface.

BACKGROUND INFORMATION

The use of equalizers in connection with particular transmission methods or standards, such as ISDN, Ethernet, DSL, is well-known. However, these transmission methods provide a continuous transmission of data or information items with the aid of the transmitted signals. However, in the case of so-called burst transmission, which is used, for example, in motor vehicles in connection with special digital interfaces, continuous transmission of data is not provided.

In particular, in automotive technology, the standards relating to fuel efficiency, minimizing pollutant emissions, and safety are becoming more and more stringent. A result of this is that larger and larger sets of data must be transmitted more and more rapidly between sensors or actuators and the control unit, the central controller. It has been shown that this is only possible by introducing new digital interfaces, with the aid of which high transmission rates may be transmitted rapidly and reliably. In this context, it should be taken into consideration that the transmission of data at higher rates requires that the digital data be modulated onto transmission frequencies higher than the frequencies that were used in the past for data transmission between sensor and control unit.

A secondary effect of the data transmission at a higher bit rate is that the modulated signals are, by far, more markedly distorted than is the case with transmission in lower frequency ranges. The distortion of the signals may lead to a significant increase in the bit error rate of the transmitted data. In principle, these channel distortions may be compensated for by equalizers at the receiver. In this connection, adaptive filters adjust automatically to unknown or changing channel environments. These days, such adaptive equalizers are used in many areas of digital communications technology.

In the case of the data transmission via the new digital interfaces and data buses that are being introduced into automotive technology, new equalizer configurations, which are introduced below, allow both the error rates to be significantly reduced and the data transmission rates to be increased by a multiple. For use in the digital transmission systems in the automotive area, a number of changes in the equalizer design in comparison with the equalizer structures known from the literature and from practice, must be undertaken due to the peculiarities of data transmission in the automotive area.

In the medium term, the use of equalizers in high-bit-rate transmission systems is inevitable in automotive technology, since the alternatives, such as low transmission rates, shorter transmission lines or the use of highly accurate and, therefore, expensive components have significant disadvantages.

In automotive technology, digital interfaces conforming to the CAN standard, the SENT standard and the PSI5 standard are used, inter alia, in the power train and in the chassis region. PSI5 (PSI: peripheral sensor interface) constitutes a digital interface for sensors, which is based on a two-wire line as a current interface and is used for connecting remote sensors to electronic control units. In the case of these new digital transmission methods, the effects of the channel distortions are of particularly high significance for the PSI5 technology, since the consequences of the channel distortions limit the possible line lengths, data transmission rates and bus topologies and produce bit error rates that are too high.

SUMMARY OF THE INVENTION

Against this background, a method having the features described herein and a digital interface according to the description herein are put forth. Refinements are derived from the descriptions herein and the specification.

Thus, a new type of equalizer is introduced for applications in digital interfaces, which are used, for example, in automotive technology. The differences with respect to known equalizer designs are described below.

The method put forward may be used in both current-modulated and voltage-modulated transmission.

Additional advantages and embodiments of the exemplary embodiments and/or exemplary methods of the present invention are derived from the description and the appended figures.

It will be appreciated that the features mentioned above and the features yet to be described below may be used not only in the combination given in each case, but also in other combinations or individually, without departing from the scope of the present invention.

DETAILED DESCRIPTION

Figure 1:
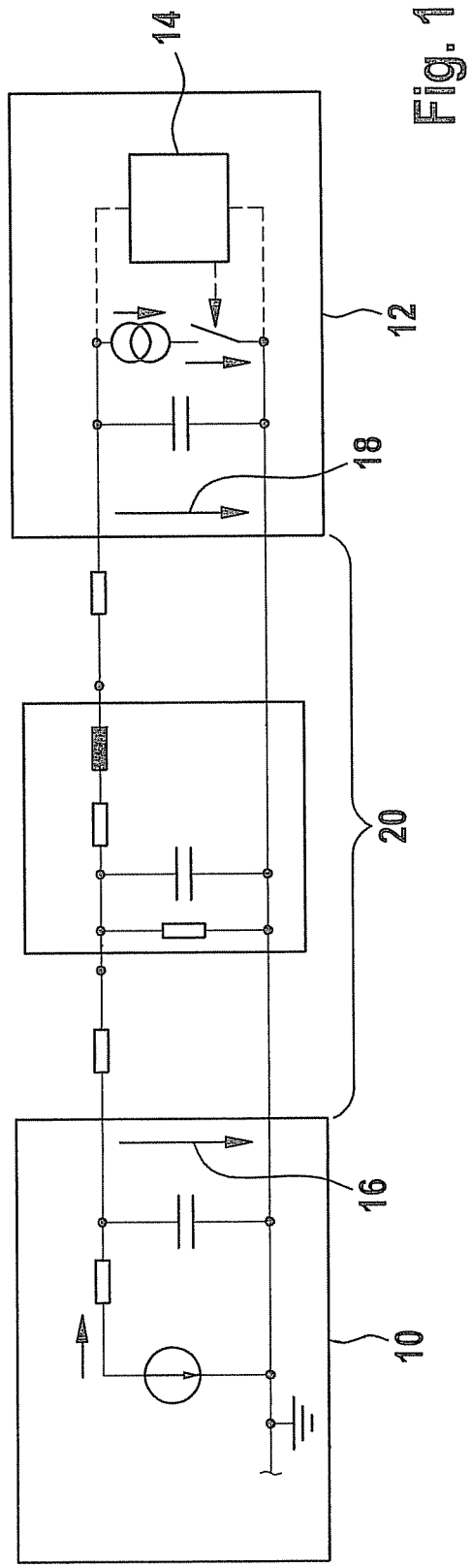
FIG. 1 shows a system for current-modulated data transmission.

The exemplary embodiments and/or exemplary methods of the present invention are represented schematically in the drawings in light of specific embodiments, and is described in detail below with reference to the drawings.

A layout of a system for current-modulated data transmission via a two-wire interface is represented in FIG. 1. The illustration shows an electronic control unit or ECU 10, as well as a sensor 12 that includes an ASIC 14. ECU 10 and sensor 12 are interconnected by a connection 20 or line. An arrow 16 illustrates the voltage at the ECU interface. A further arrow 18 shows the voltage at the sensor interface. Between them, the total resistance of connection 20 is represented in an equivalent circuit diagram.

The PSI5 interface uses a current-modulated, two-wire transmission technique, as is represented in FIG. 1, for example. According to the PSI5 standard, the digital data are Manchester-encoded. In this connection, modulation onto the low/high or high/low combination of data symbols is performed for each bit (0 or 1).

In the case of the PSI5 transmission, the duration of the high and low phases is nominally 4 µs, by which a bit period of the Manchester-encoded data lasts 8 ms. This corresponds to a transmission rate of 125 kbit/s. Alternatively, the PSI5 standard also permits bit periods of 53 µs, which corresponds to a transmission rate of 189 kbit/s.

The PSI5 data are organized in data frames, whose length may be from 11 to 33 bits. Pauses, during which no data transmission takes place, are situated between the data frames. In addition to an asynchronous transmission mode, PSI5 also has a synchronous transmission mode. In this connection, the control unit transmits voltage-modulated pulses, such as synchronization pulses or "sync pulses," that may also be referred to as trigger pulses from which the sensor derives the temporal synchronization or the timing for transmitting its data frames. In the synchronous mode, PSI5 also renders bus transmission possible, since the individual users of the bus may derive the time for transmitting their data from the synchronization pulse. Since it is possible that the sensors do not have a highly accurate clock as a clock generator, the time base of the sensors may vary relative to the time base of the control unit. Consequently, the time at which the sensors transmit their PSI5 data frames may also vary relative to the time base of the control unit. In asynchronous mode, the transmitter, e.g., a sensor or actuator, transmits the data by itself. The receiver, normally the control unit, must receive the data and appropriately correct it. Consequently, the receiver adjusts to the received data itself.

Figure 2:
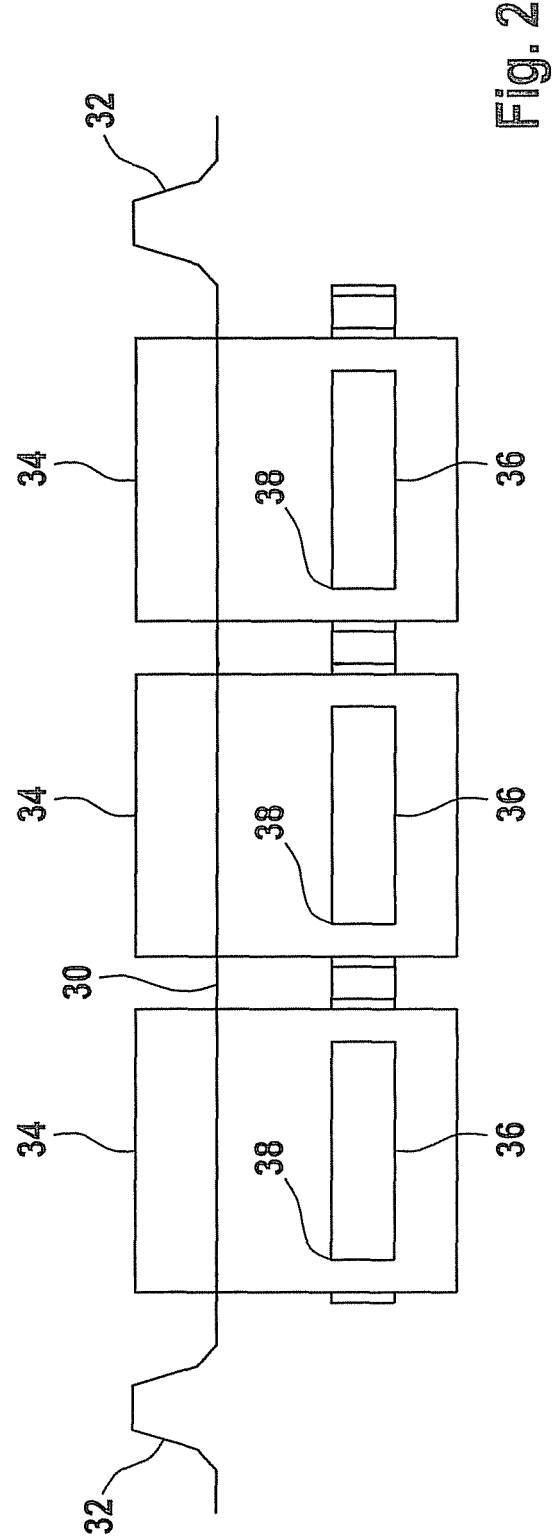
FIG. 2 shows the time characteristic of a PSI5 data transmission: The control unit side transmits voltage pulses in fixed intervals as synchronization signals. In the time intervals defined by them, the sensor transmits current-modulated data packets.

FIG. 2 shows a PSI5 data transmission triggered by a signal 30, which is output by the control unit during a synchronous transmission, and which transmits synchronization pulses 32. Time windows 34, in which the actual PSI5 data frames 36 transmitted by the sensors are situated, are defined in a fixed temporal relationship to the synchronization pulses. Nominal starting time 38 of PSI5 data frames 36 may be programmed for each sensor.

Linear distortions of the amplitude and the phase of the transmitted signals cause the pulse shape to change and the expanded pulses to interfere with one another.

Figure 3:
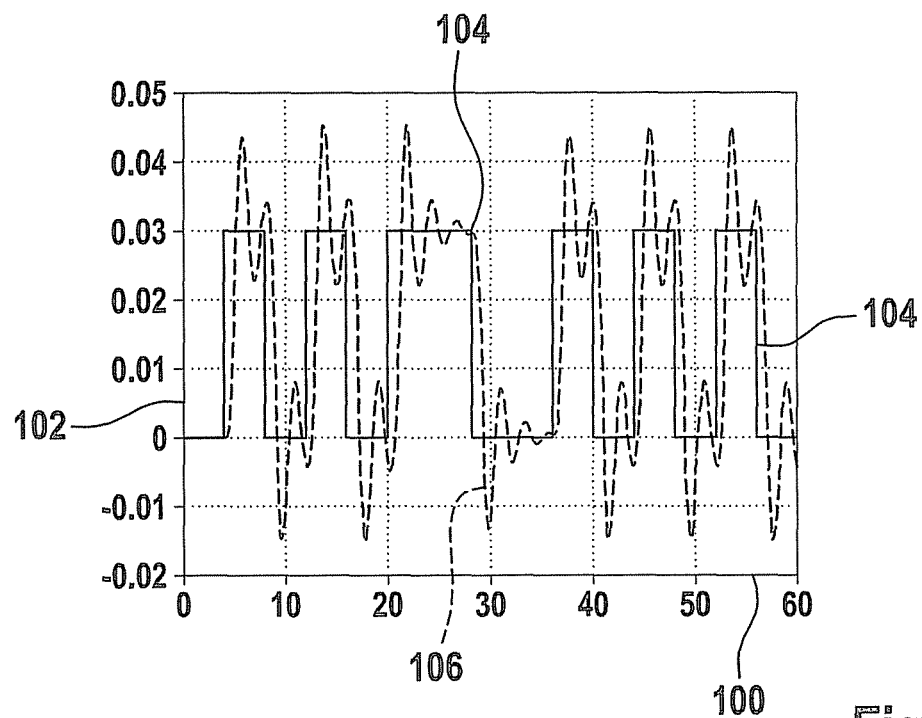
FIG. 3 shows, in a graph, an example of a distortion of a PSI5 signal in the case of an inductive channel.
Figure 4:
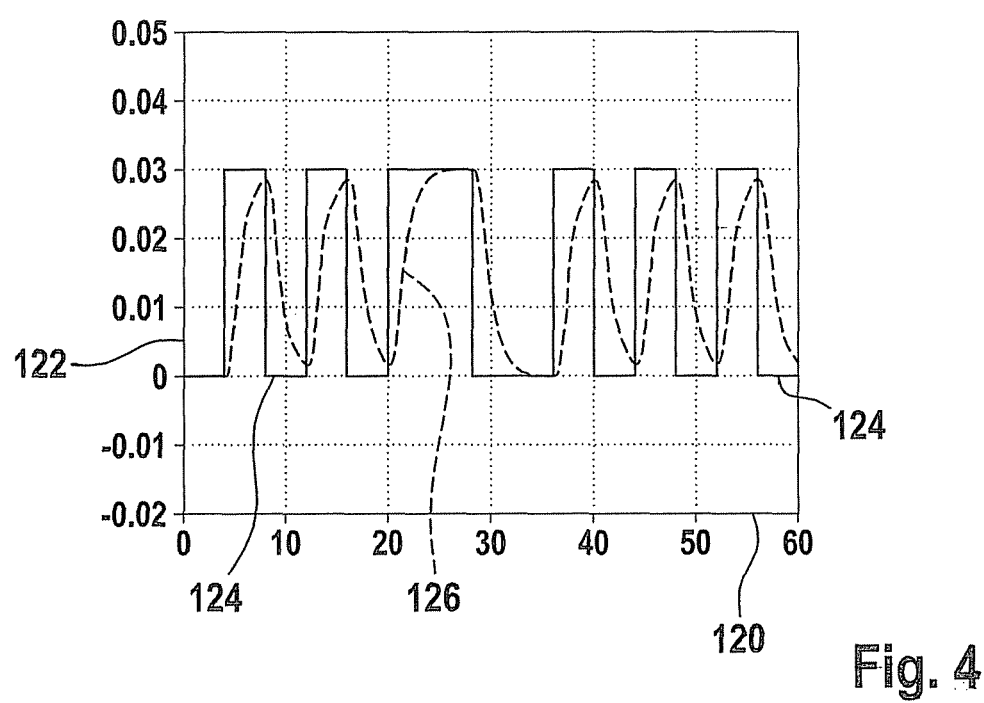
FIG. 4 shows, in a graph, an example of a distortion of a PSI5 signal in the case of a capacitive channel.

FIGS. 3 and 4 show examples of transmitted, Manchester-encoded PSI5 signals and the corresponding distorted pulses at the receiver. In FIG. 3, the time in µs is plotted on an abscissa 100, and the current in A is plotted on an ordinate 102. The curve of a signal to be transmitted 104 and the curve of the signal distorted by the transmission (inductive channel) 106 are illustrated in the graph.

In FIG. 4, the time in µs is plotted on an abscissa 120 and the current in A is plotted on an ordinate 122. The curve of a signal to be transmitted 124 and the curve of the signal distorted by the transmission (capacitive channel) 126 are illustrated in the graph.

The distortions of the PSI5 signals are a strong function of the length of the line and the respective wiring. The examples in FIGS. 3 and 4 show distortions of the transmitted PSI5 signals, which are completely possible in the case of point-to-point connections within the scope of the tolerances of the line parameters and wiring parameters specified in the PSI5 standard.

FIGS. 3 and 4 illustrate that the distortions of the transmission signal lead to a significant deterioration in the transmission quality.

Figure 5:
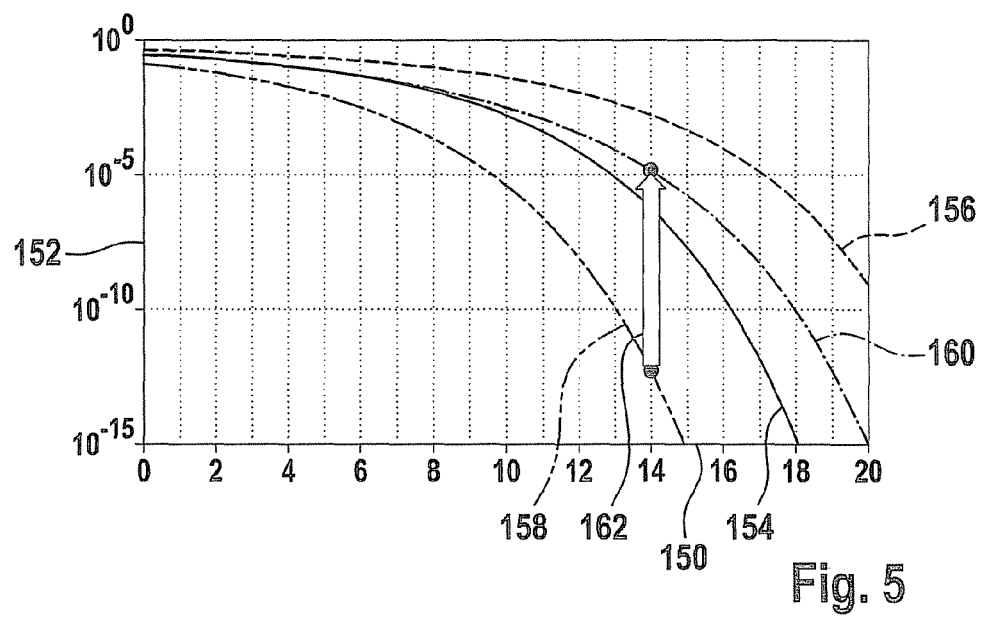
FIG. 5 shows, in a graph, the bit error rate as a function of the signal-to-noise ratio.

In light of the example of the transmission channel from FIG. 3, FIG. 5 shows how the bit error rate may increase significantly due to the channel distortions. In this context, the signal-to-noise ratio is plotted in dB on an abscissa 150, and the bit error probability in a PSIS transmission is plotted on an ordinate 152. A first curve 154 shows the errors detected by the PSIS error detection (ideal channel), a second curve 156 shows the measured errors (inductive channel), a third curve 158 shows the errors not detected (ideal channel), and a fourth curve 160 shows the errors not detected (inductive channel). An arrow 162 illustrates the increase of the bit error rate due to the channel distortion.

In practical application, pulses having a limited bandwidth, e.g., having rounded-off, S-shaped edges, are used in the modulation of digital signals in place of square-wave pulses having a large bandwidth. This is used, first and foremost, for reducing the emissions by these signals in the high-frequency range. In addition, this shaping has the advantage that in the case of many possible types of lines, the distortions through the channel may be reduced.

Figure 6:
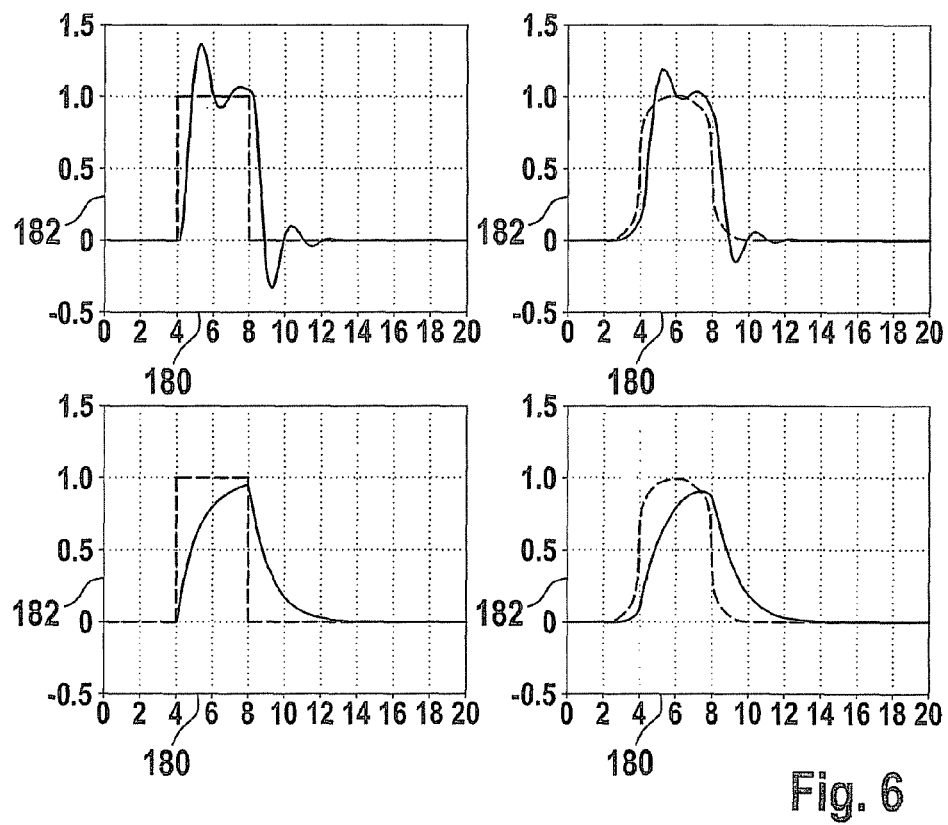
FIG. 6 shows, in four graphs, comparisons of pulse shaping according to the related art, which is supposed to minimize the effects of channel distortions.

To that end, FIG. 6 shows, in four graphs, the comparison of the transmission of square-wave pulses and pulses having rounded-off edges (shaping) with regard to channel distortions. In this context, in each instance, the time in µs is plotted on an abscissa 180, and the signal level is plotted on an ordinate 182. As the examples in FIG. 6 show, the influence of the channel may indeed be reduced by limiting the band of the signal; nevertheless, the received signal continues to be distorted.

In automotive technology, the following different line topologies are used for the communication between the control unit (ECU: electronic control unit) and the peripheral units, such as sensors or actuators:

point-to-point connections
bus connections

In point-to-point connections, a dedicated line is available to each peripheral unit (sensor, actuator) for communicating with the control unit. However, in the case of bus connections, several peripheral units (sensors, actuators) share one conductor connection to the control unit. The big advantage of data bus systems is that the number of lines in the vehicle may be reduced. In addition, fewer digital interfaces are required at the control unit.

Figure 7:
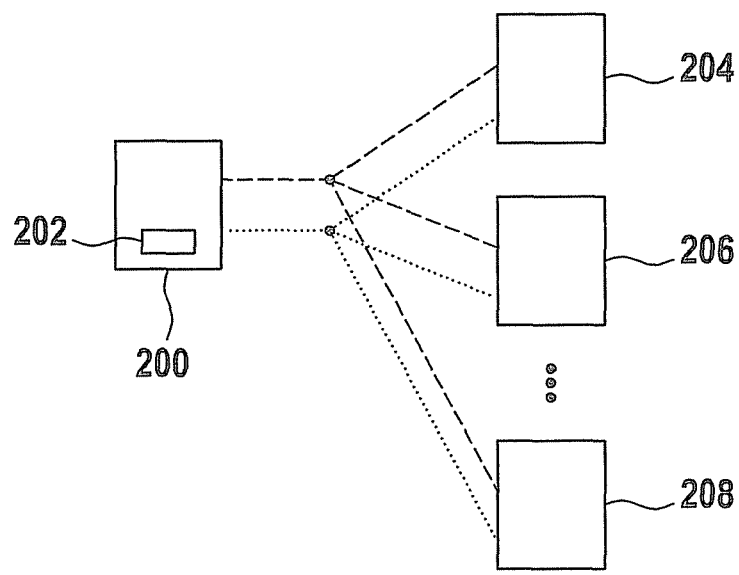
FIG. 7 shows, in a schematic illustration, a sensor bus system having a star topology.

FIG. 7 shows the example of a sensor bus system having a star topology. The illustration shows a control unit 200 having an ECU 202; a first sensor 204; a second sensor 206; and an nth sensor 208.

For PSI5 systems, transmission via simple bus topologies is planned as an option for point-to-point transmission. However, one disadvantage of these bus topologies is that they produce, by far, more marked distortions of the signals than in the case of point-to-point connections. In a bus system, different users (peripheral units) do share one physical transmission line, but the transmission channels between each user and the receiver are fundamentally different.

Figure 8:
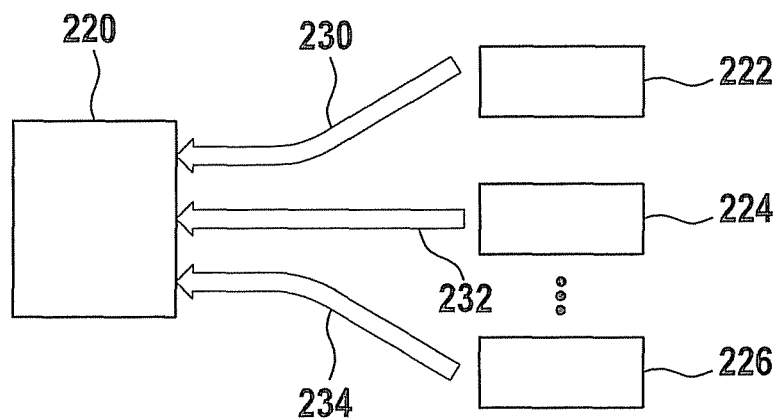
FIG. 8 shows the different transmission channels in a sensor bus system.

FIG. 8 shows transmission channels in a sensor bus system. In this context, a control unit 220, a first sensor 222, a second sensor 224 and an nth sensor 226 are illustrated. Correspondingly, a first transmission channel 230, a second transmission channel 232, and an nth transmission channel 234 may be seen.

Figure 9:
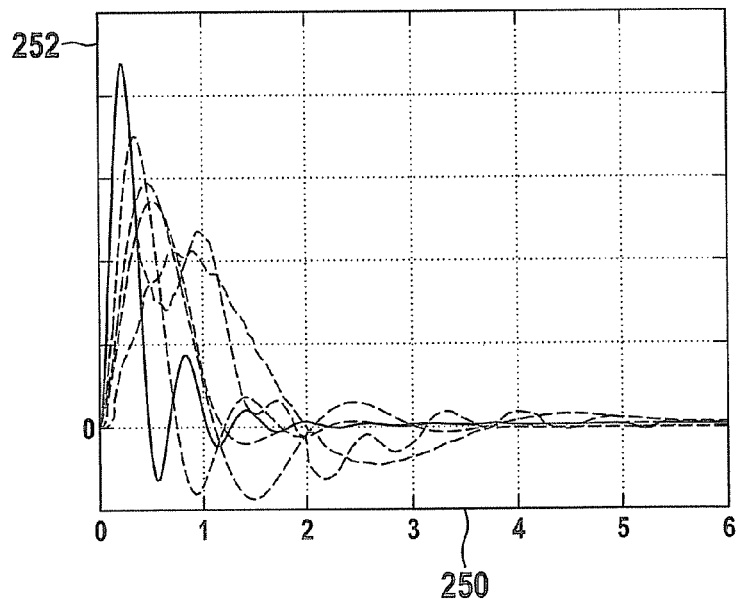
FIG. 9 shows examples of different channel pulse responses within a bus system.

The illustration shows that different channels, which may each have different channel pulse responses, as well, as is shown, e.g., in FIG. 9, are present between each sensor 222, 224, 226 and control unit 220.

FIG. 9 shows examples of different channel pulse responses within one bus system. In this context, the time in µs is plotted on an abscissa 250, and the signal level is plotted on an ordinate 252. The graph shows the channel pulse responses for different channels having different line topologies and channel transfer functions, which results in different distortions.

The linear distortions of the transmission channel may be canceled out again at the receiver with the aid of adaptive equalizers, so that the original transmitted signal is reproduced. To this end, the received signal is filtered in order to compensate for the channel distortions. In this context, the adaptive filter of an equalizer may automatically adapt to unknown or changing channel environments.

In communications technology, adaptive equalizers are used in many wired and wireless systems. However, up to now, adaptive equalizers have not been used in the case of digital data transmission in automotive technology. A possible reason for this is that the use of adaptive equalizers requires an analog-to-digital converter beforehand, which has a resolution of several bits; whereas in current automotive technology, modulated (digital) received signals are mostly reconverted into their digital values with the aid of simple and low-cost 1-bit comparators. A further possible reason is that in the case of the frequency ranges and transmission lines used up to now, the distortions have not yet been so large, which means that demodulation by simple comparators has been sufficient.

However, it should be taken into consideration that in the case of PSI5 transmission, the limits with respect to transmission rates and line topologies, at which transmission may be carried out at low error rates without an equalizer, are reached or exceeded. As shown before, the distortions of the PSI5 signal due to the effects of the transmission line and wiring may produce a marked deterioration of the transmission quality. The signal-to-noise ratio is degraded by the distortions of the received signals, which results in an increase in the transmission error rate. In addition, expanded pulses interfere with one another, which is referred to as intersymbol interferences and leads to transmission errors, as well. However, these distortions may be canceled out by a simple equalizer circuit at the receiver.

The use of adaptive equalizers in PSI5 systems has considerable advantages in comparison with systems, which only use a simple sampling comparator for analog-to-digital conversion. The advantages of the use of equalizers for PSI5 systems include, in particular:

Transmission over longer lines (>10 m) is easily possible. The channel distortions do increase with the length of the line, but an equalizer may compensate for these distortions.

PSI5 transmission at transmission rates higher than 125 kbit/s is possible without restrictions. PSI5 transmission at 189 kbit/s or even 250 kbit/s may be achieved in this manner. By eliminating distortion from the received signal, intersymbol interferences do not even occur at high transmission rates.

Bus topologies may be implemented, since equalizers compensate for channel distortions occurring in this case.

The tolerances of the utilized components are subject to standards that are not so strict, since the equalizers adapt to the unknown channel conditions. This also applies to the standards for the transmission line.

The emissions from the PSI5 transmission may be reduced by optimizing the pulse shaping of the transmitted signals with regard to the lowest possible emissions. An equalizer may convert these rounded pulses into square-wave pulses again.

Figure 10:
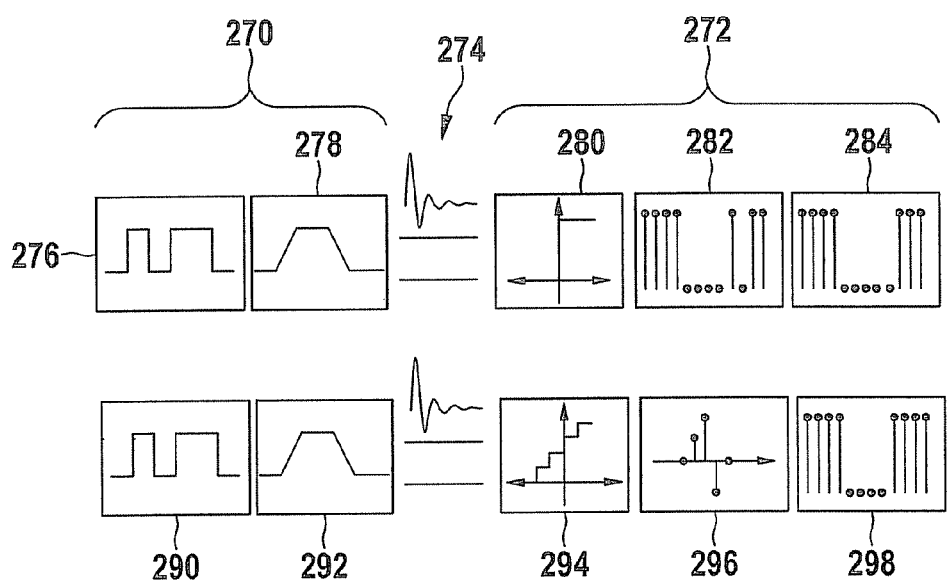
FIG. 10 shows a PSI5 transmission link with and without an adaptive equalizer.

The principal differences between today's typical PSI5 transmission link having a sampling comparator, and a PSI5 transmission link having an adaptive equalizer at the receiver, are illustrated in FIG. 10.

FIG. 10 shows a comparison of a typical PSI5 transmission link to a PSI5 transmission link having an adaptive equalizer. In this context, the region of a sensor 270 is illustrated on the left side, and the region of a control unit 272 is illustrated on the right side, the sensor and the control unit each being interconnected via a two-wire connection 274. At the top, in the region of sensor 270, the figure shows a Manchester-encoded signal 276, which is modulated with the aid of slope-shaping 278. After transmission, the signal is sampled 280 in a sampling comparator in control unit 272. Acquired symbols are represented in block 282. These are subjected to a majority decision, so that the symbols illustrated in block 284 are present.

A Manchester-encoded signal 290 and its modulation 292 are shown again at the bottom of the illustration. In control unit 272, the received signal is sampled by an n-bit analog-to-digital converter 294 and subsequently corrected by an adaptive equalizer 296. In block 298, the acquired symbols are then illustrated.

In a typical PSI5 receiver, 1-bit decisions (level 0 or 1) are made with the aid of a sampling comparator. The Manchester-encoded symbols are decoded on the basis of these decisions.

In a PSI5 Receiver having an equalizer, the receiver signals are converted into digital data words by a multistage, n-bit analog-to-digital converter. The adaptive equalizer circuit is a filter followed by a discriminator (0, 1). The adaptive filter compensates for the channel distortions, so that the filter output signals already have (approximately) the level 0 or 1.

Figure 11:
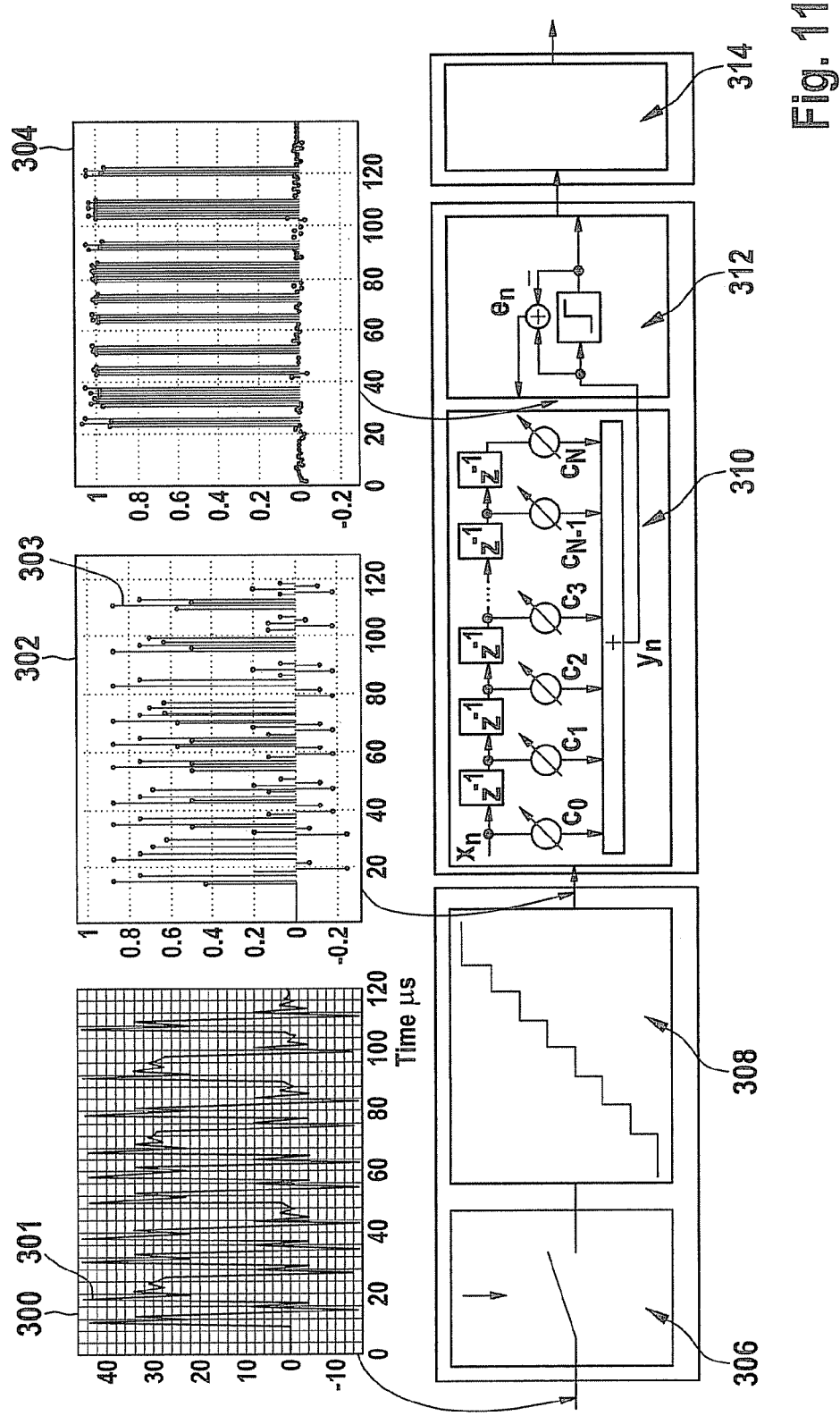
FIG. 11 shows the principle of a PSI5 receiver having an adaptive equalizer.

The principle of a PSI5 receiver having an adaptive, linear equalizer is graphically illustrated in the chart in FIG. 11. In this context, the curve of a received signal 301 is represented in a first graph 300, the curve of an ADC output signal, the sampled, received signal 303, is represented in a second graph 302, and the curve of the output signal of an adaptive filter is represented in a third graph 304. The individual processing stages are represented underneath them, namely, a sampler 306, an n-bit quantizer 308, an adaptive filter 310, a discriminator or a decision device 312, and a Manchester decoder 314.

In practical equalizer implementations, one obtains the optimum coefficients $c_i$ of the adaptive filter with the aid of an iterative method. For example, the least mean square (LMS) algorithm is a known adaptive method for optimizing the equalizer coefficients (based on the mean square error criterion).

The iterative optimization of the equalizer coefficients is achieved with the aid of an error signal, which is minimized. The error signal $e_n$ is the difference between the desired equalizer output signal $a_n$ and the actual equalizer output signal $y_n$. Using this error signal and the equalizer input data vector $x_n$, the equalizer coefficients are iteratively adapted, as described in the following equation:

$$e_n = \hat{a}_n - c_n^T \cdot x_n, \text{ where } c_n^T \cdot x_n \text{ equals } y_n, \text{ the equalizer output;}$$

$$c_n + 1 = c_n + \Delta \cdot e_n \cdot x_n$$

c: vector of the filter coefficient weightings
x: input vector (received data)
$y_n$: output signal of the adaptive filter
$e_n$: estimation error ($\hat{a}_n - y_n$)
$e_n \cdot x_n$: estimate of the gradient vector
$\hat{a}_n$: decided symbols
$\Delta$: step-size parameter (increment)

Figure 12:
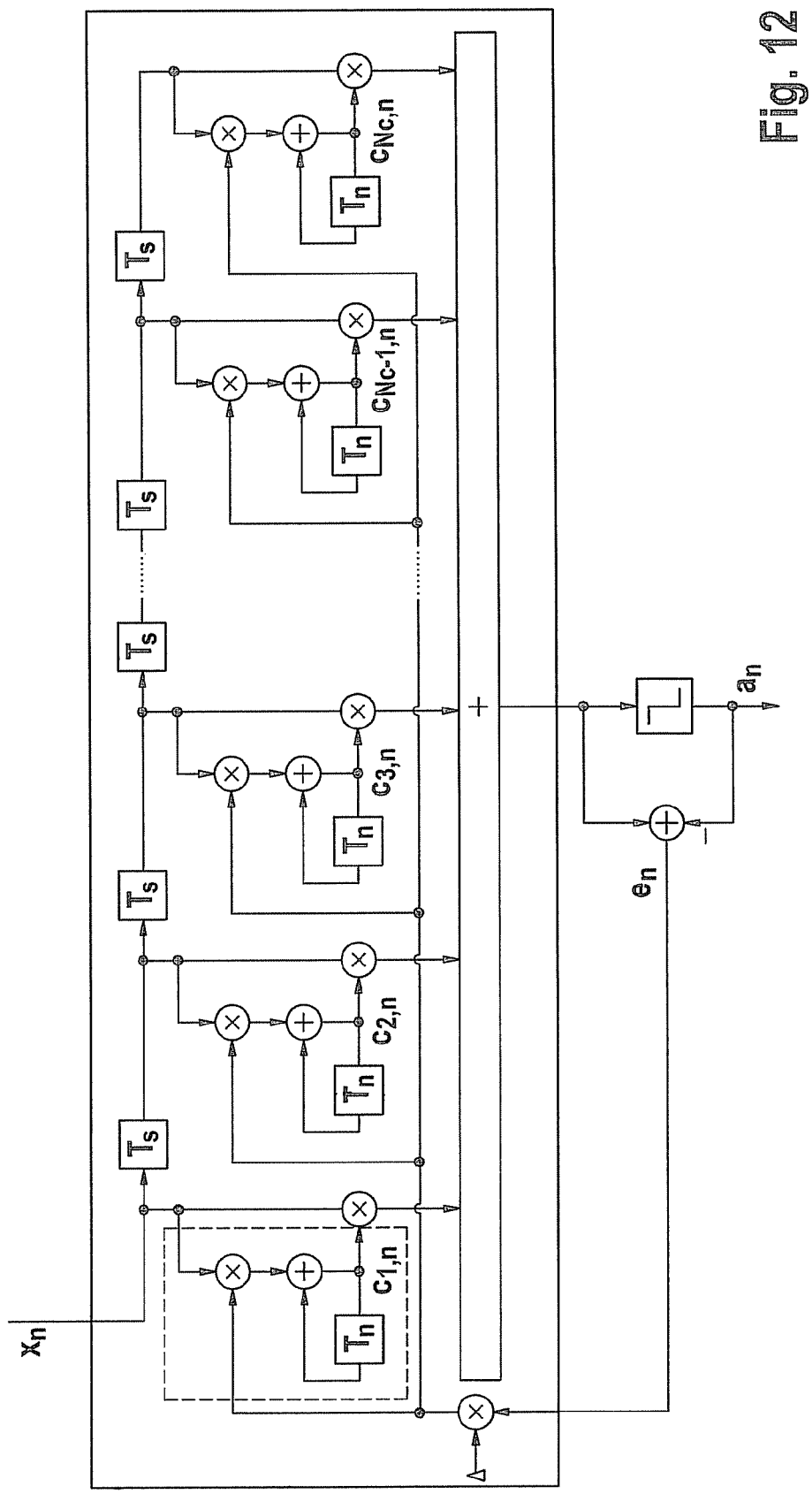
FIG. 12 shows the principle of an adaptive linear transversal filter.

The block diagram of a linear, adaptive transversal equalizer represented in FIG. 12 implements the equalizer equations specified here. In the case of a simplified implementation, the algebraic sign of error signal $e_n$ may be used in place of $e_n$ as an input signal of the coefficient update mechanism.

Figure 13:
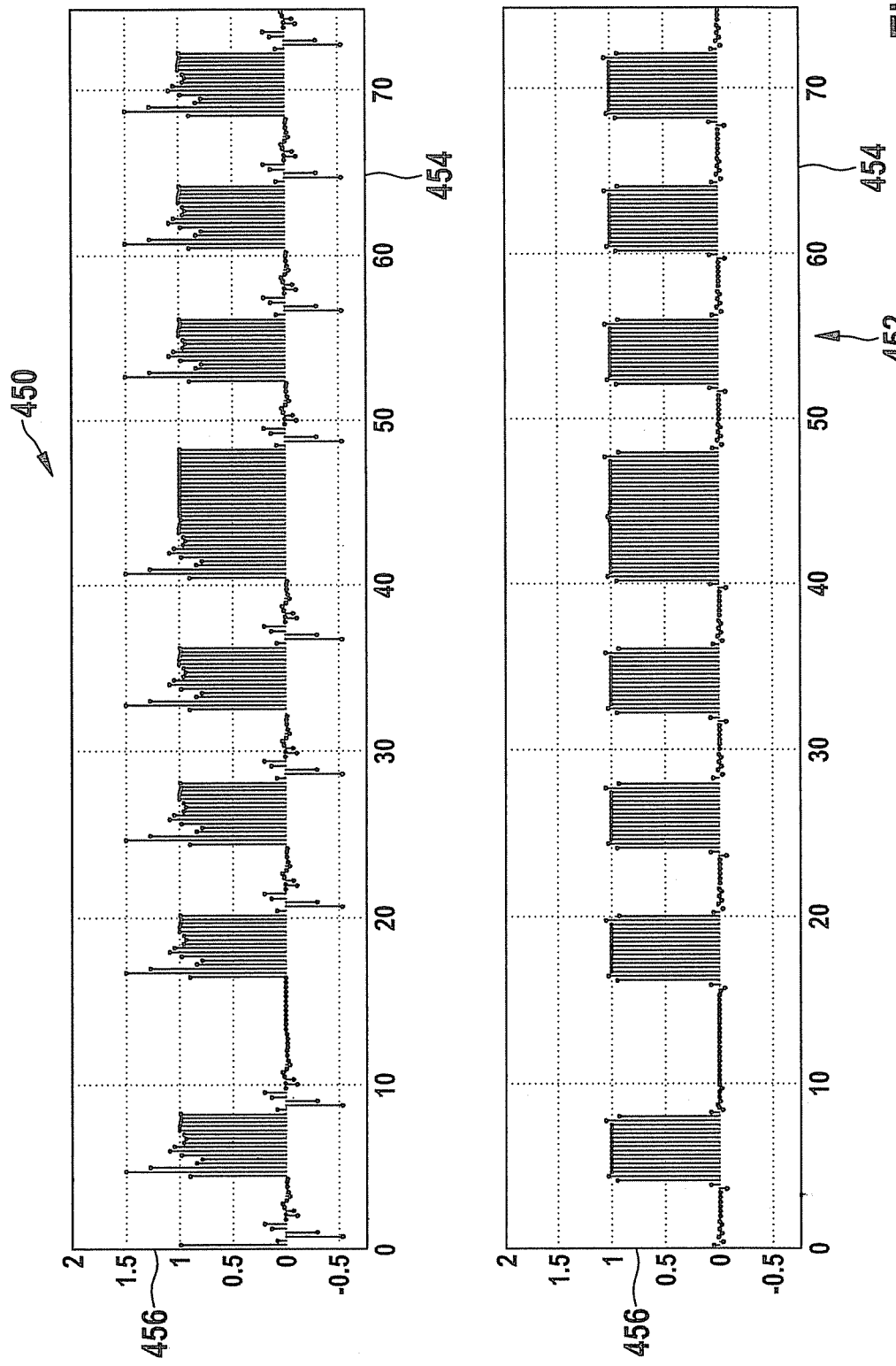
FIG. 13 shows, in two graphs, the compensation for channel distortions of the received signal with the aid of an adaptive correction filter.

The compensation for the channel distortion of the received signal with the aid of an adaptive equalizer is exemplarily illustrated in FIG. 13 in view of a PSI5 signal. The illustration shows two graphs; the signal input at the equalizer being represented in first graph 450, and the signal output at the equalizer being represented in a second graph 452. In the two graphs 450 and 452, in each instance, the time in µs is plotted on an abscissa 454, and the signal level is plotted on an ordinate 456.

In the case of equalization using single sampling (one sampling value per data symbol), it is necessary for the receiver to be synchronized accurately with the clock-pulse rate of the received signal. The equalizer performance is very sensitive with regard to an accurate clock-pulse synchronization (errors of the timing phase lead to aliasing errors of the equalizer signal). In contrast to this, an equalizer having double or multiple sampling may compensate for any timing phase of the sampling. Thus, an equalizer having double or multiple sampling (fractionally-spaced equalizer) is equivalent to a matched filter, which is followed by an equalizer having single sampling.

Up to now, the equalizer principle has been illustrated in view of receiver layouts having linear equalizers (nonrecursive equalizers). In some transmission channels, zero values of the channel on the unit circle would lead to singular solutions of the equalizer. In a linear equalizer, the noise would be amplified in this manner.

In such a case, one uses nonlinear equalizers having quantized feedback (decision feedback equalizer). An equalizer having quantized feedback has two adaptive filters, the feedforward filter and the feedback filter. The received data are the input signal of the feedforward filter, while the detected symbols are present at the input of the feedback filter.

Figure 14:
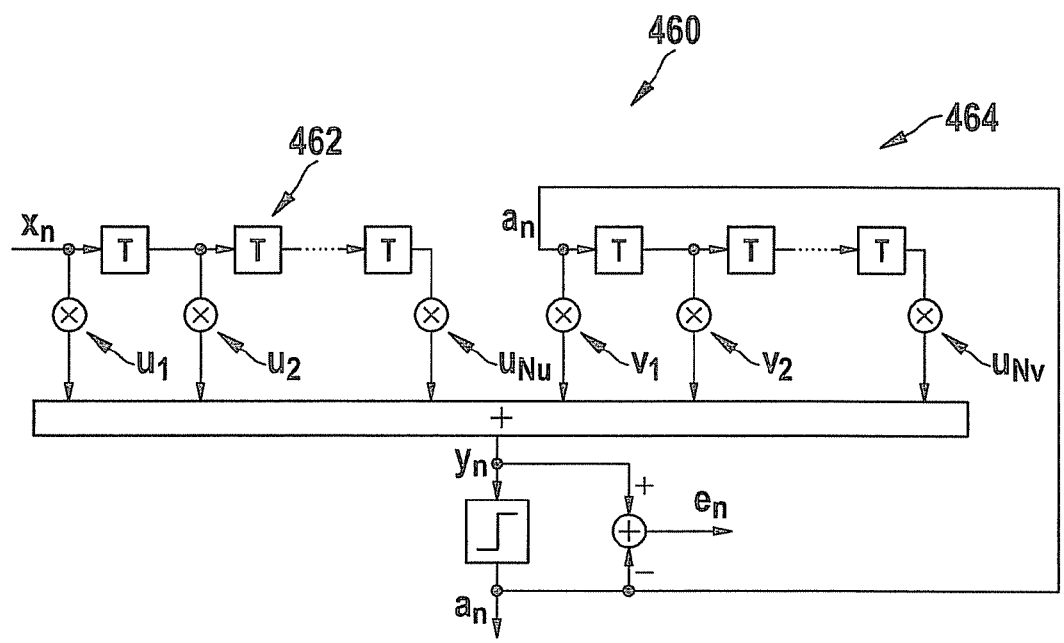
FIG. 14 shows, in a circuit diagram, a nonlinear correction filter having quantized feedback.

FIG. 14 shows a nonlinear equalizer, which has quantized feedback and is denoted as a whole by reference numeral 460. It includes a feedforward filter 462 and a feedback filter 464.

The boundary conditions for correcting PSI5 signals differ from the boundary conditions for correcting the signals of known, wired transmission systems, such as DSL, ISDN or Ethernet, in several fundamental respects.

Special boundary conditions for equalizers in PSI5 systems:
burst transmission (short frames including data, and between them, phases without a signal)
drift of the transmitter frequency over t<1 ms
variance of the transmitting frequency of ±5%
frequency difference of consecutive frames of up to 10%
bus architectures lead to changing channel pulse responses in consecutive data frames A fundamental difference of the PSI5 transmission from known, wired transmission systems is that in PSI5, the signals are not transmitted as a continuous data stream, but individual data frames are transmitted as a sequence of modulated symbols, as is illustrated, for example, in FIG. 2. Between the frames and during the time of the synchronization pulses (of the side of the control units), there are pauses in the PSI5 transmission in which no modulated signal is transmitted. With regard to the equalization, PSI5 transmission may be regarded as burst transmission.

For this reason, in contrast to known equalizer designs, synchronization with the clock of a transmitter is very difficult, since the clock-pulse phase of the transmitter may only be acquired during the brief burst time. Therefore, it is difficult to use equalizer designs, in which the receiver and the equalizer are synchronized with a clock pulse phase.

However, as was explained above, the performance of equalizers having double or multiple sampling is not sensitive with regard to the choice of sampling phase (for in this case, only synchronization with the clock-pulse rate of the received signal must be carried out). With regard to the implementation in PSI5 systems, this means that equalizer types having multiple sampling (fractionally-spaced equalizer) are used in place of equalizers that operate with single sampling. That is to say, that the equalizer uses two or more sampling values per Manchester half-symbol as an input signal.

There are still other difficulties in equalizing PSI5 signals in a bus system:
The channels of individual users each have different channel pulse responses, as was already shown in FIGS. 7, 8 and 9. The result of this is that the signals of consecutive PSI5 frames in a bus system may be distorted in different manners. The equalizer cannot adapt to a particular channel, since in bus operation, signals each having different channel pulse responses alternate with each other.
Clocks of the individual users may have different frequencies. Therefore, the symbol transmission rates of the transmitted signals of the individual users also deviate from one another. In this manner, the symbol interval durations of consecutive frames deviate considerably from one another.

Equalizer systems for PSI5 receivers differ in the following respects from the equalizer systems known from the literature and from practice:

Equalizers for PSI5 receivers may be configured for operation in both synchronous and asynchronous mode. In synchronous mode, both point-to-point transmission and bus operation are possible.

As described above, in synchronous mode, the control unit transmits pulses by which the transmitting of PSI5 frames is triggered at the sensor. In asynchronous mode, the sensor clock, which is asynchronous with respect to the ECU, determines the transmission rate of the PSI5 signals.

An important characteristic of the equalizers for PSI5 systems is that they support double or multiple sampling of the received signals (fractionally-spaced equalizer). That is, the equalizer operates at a multiple of the symbol transmission rate (fractionally-spaced equalizer), as was described above.

In synchronous mode, the interface may control the data transmission phases of the transmitter, using trigger or synchronization signals, which means that the operating states of the equalizer may be coupled to the data transmission phases of the transmitter. In asynchronous mode, the sequence of the operating states of the equalizer is derived from the data transmission phases of the received signal.

The adaptation of the equalizer may only be carried out in particular time intervals. The adaptation phases may be started and ended by a different unit, for example, a state machine. Either the equalizer is in adaptation mode, or the adaptation mechanism of the equalizer coefficients is stopped (equalizer frozen). The adaptation phases are coupled to the PSI5 transmission and the PSI5 protocol.

When using PSI5 in bus operation, the known equalizer design must be expanded to the effect that in each instance, separate equalizer coefficient sets are available for the different transmission channels of the individual sensors. Since the channel pulse responses of consecutive PSI5 frames differ, the equalizer coefficients must be exchanged in each instance. The equalizer uses the coefficient sets alternately. In this manner, each channel assigned to the respective sensors may be equalized, using its appropriate coefficients. A state machine, which controls the following tasks and functions, is necessary:

exchange of equalizer coefficients
coupling of the coefficient exchange to the PSI5 protocol
The state machine fulfills several tasks for the equalizer:

First of all, the state machine controls the change of the phases, in which either the equalizer is in adaptation mode, or in which the equalizer adaptation is stopped (equalizer frozen). In the case of equalizers for the PSI5 bus operation, this state machine also controls the exchange of equalizer coefficients, which are assigned to the specific transmission channels of the individual sensors at the bus. In addition, the state machine may (optionally) only permit the adaptation of the equalizer at particular phases of the operation of the system (e.g., only during initialization of the system).

In order to know when a PSI5 frame is to be expected and when this PSI5 frame actually arrives inside of the predetermined interval, the state machine needs various input information items.

The time window in which the receiver can expect PSI5 data frames is determined by the PSI5 protocol and the timing generator of the PSI5 transceiver. The state machine of the PSI5 equalizer receives the information about the sequence of the PSI5 data frame windows from the PSI5 control and regulating unit, which also ensures that the PSI5 protocol is executed.

The time information of the timer of the transceiver, which also triggers the PSI5 sync pulses (synchronization pulses), is also available to the state machine. Consequently, the state machine may determine the temporal position of the windows, inside of which the PSI5 frames are expected.

Figure 15:
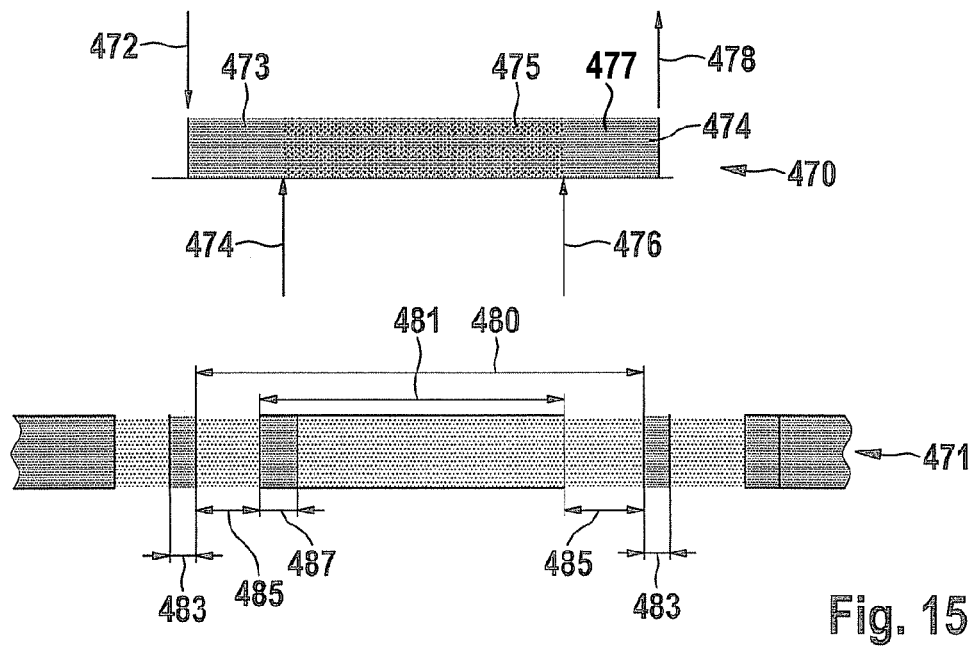
FIG. 15 shows the coupling of the adaptation phase of the equalizer to the PSI5 frame structure.

FIG. 15 shows the coupling of the adaptation phase of the equalizer to the PSI5 frame structure. In this context, states of the equalizer are shown at the top of the figure 470, and received PSI5 data frames are shown at the bottom of the figure 471. At a time 472, a coefficient set for sensor n from the memory is loaded into the adaptive filter The equalizer assumes a first state 473, "coefficients frozen." At a further time 474, the beginning of the frame is detected. The equalizer then assumes the second state 475, "adaptation mode," up to a further time 476, at which the end of the frame is detected. The equalizer subsequently assumes the third state 477, "coefficients frozen." At a time 478, the coefficient set for sensor n is written into the memory of the adaptive filter.

In the representation at the bottom, the PSI5 data frame window is indicated by a double arrow 480, and the PSI5 data frame is indicated by a double arrow 481. Double arrows 483 indicate a time span, and double arrows 485 indicate a temporal tolerance. A further double arrow 487 indicates the starting sequence. The adaptation phases of the equalizer are a function of the protocol and the synchronization or trigger pulses.

The time windows in which the equalizer may adapt are situated inside of the time windows in which a PSI5 frame can be expected (see FIG. 15). In order to be able to determine the equalizer adaptation phase, the state machine needs the information as to when a received PSI5 frame begins and when it ends. The state machine receives the information about the beginning of a PSI5 frame and the end of a PSI5 frame from the PSI5 demodulator and decoder. The PSI5 demodulator contains a mechanism for detecting the beginning of a frame and the end of a frame.

In this manner, the adaptation windows, within which the equalizer coefficients may adapt, may be synchronized with the incoming PSI5 frames.

In bus operation, the PSI5 control and regulating unit supplies the state machine with the information about the number of sensors at the bus and about the sequence of the transmitting time windows of the specific sensors. This information is necessary for the equalizer coefficient exchange.

Figure 16:
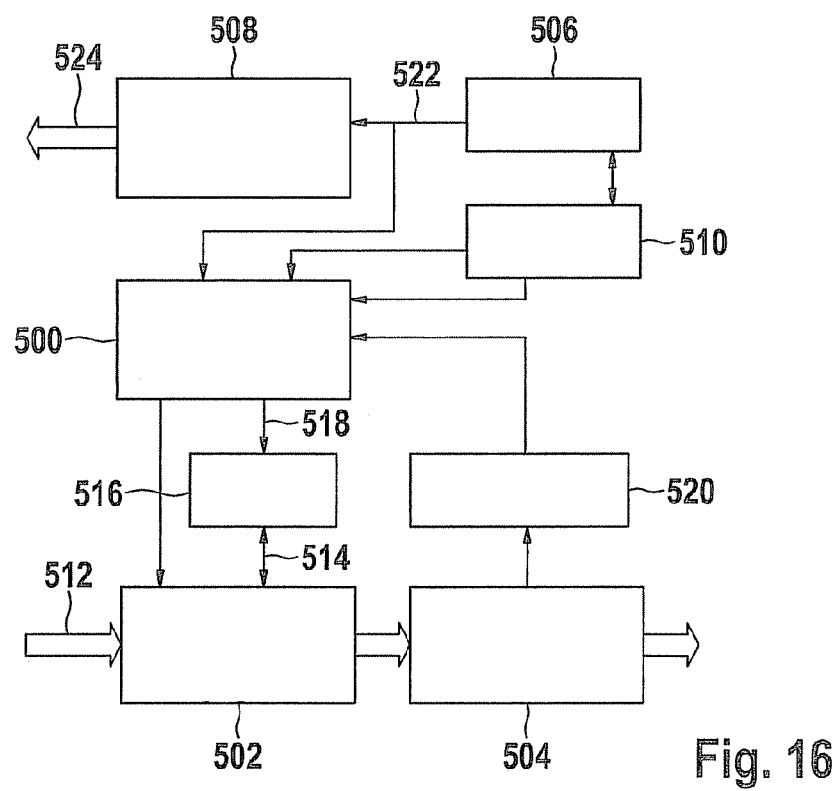
FIG. 16 shows the control of an equalizer for received PSI5 data.

FIG. 16 shows the control of an equalizer for received PSI5 data. Herewith, the states of the equalizer may be coupled to the time sequence of the PSI5 data transmission. The illustration shows a state machine 500, an adaptive equalizer 502, a unit 504 having a receiver, demodulator and PSI5 decoder, a timing generator or timer 506, a transmitter 508 having a pulse generator, and a PSI5 control system 510.

PSI5 signals 512 are received and corrected in equalizer 502 and transmitted to unit 504. Equalizer 502 exchanges read-write coefficients 514 with a unit 516 for exchanging the coefficient sets. This unit 516 is triggered 518 by state machine 500. To this end, state machine 500 obtains information 520 regarding the beginning and the end of a data frame from unit 504. In addition, state machine 500 receives information from PSI5 control system 510, which communicates with timer 506. In turn, this timer 506 transmits trigger signals 522 to transmitter 508, which emits pulses 524.

While an exchange of coefficients at the equalizer is not necessary in the case of point-to-point connections (synchronous or asynchronous), in bus mode, the receiver must alternately use the coefficient sets assigned, in each instance, to the individual sensors or channels.

Figure 17:
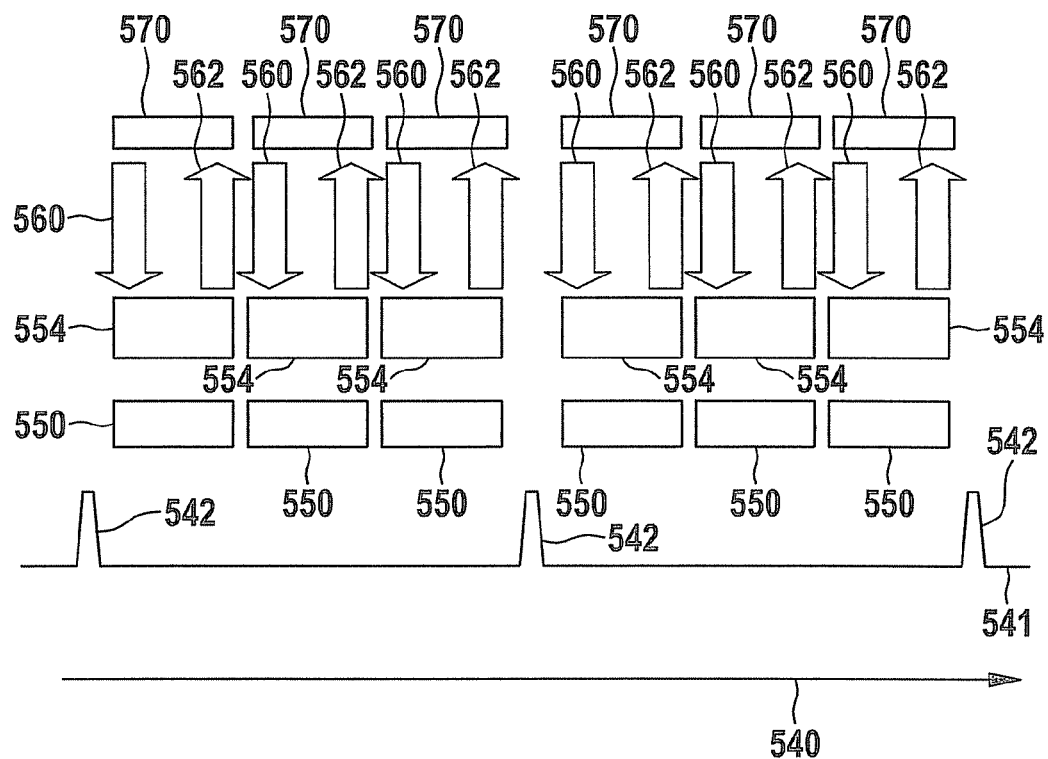
FIG. 17 shows the control of the exchange of the correcting-filter coefficient sets with respect to the time characteristic of the PSI5 transmission.

FIG. 17 shows the time intervals of the PSI5 transmission in the time characteristic. In this context, the control of the exchange of equalizer coefficient sets is explained. The illustration shows a time axis 540 and a signal 541, which is output by the control unit and carries synchronization pulses 542. Time slots 550 of the bus users, in which equalizer coefficient sets 554 are exchanged with read-write memories 570 via reading 560 and writing operations 562, are accordingly indicated.

The time slots 550, in which the individual sensors may transmit at the bus, are indicated by the synchronization signals of the control unit. The sequence and possible duration of the transmission windows of the individual bus users is determined by the specified transmission protocol. From this, the time intervals, in which the equalizer needs the coefficient sets assigned to the specific sensors, are known.

At the beginning of the time window, which is provided for the specific sensor, these coefficient sets are read out from a write/read memory into the adaptive filter of the equalizer, and at the end of the time window, they are written back into the memory again.

Figure 18:
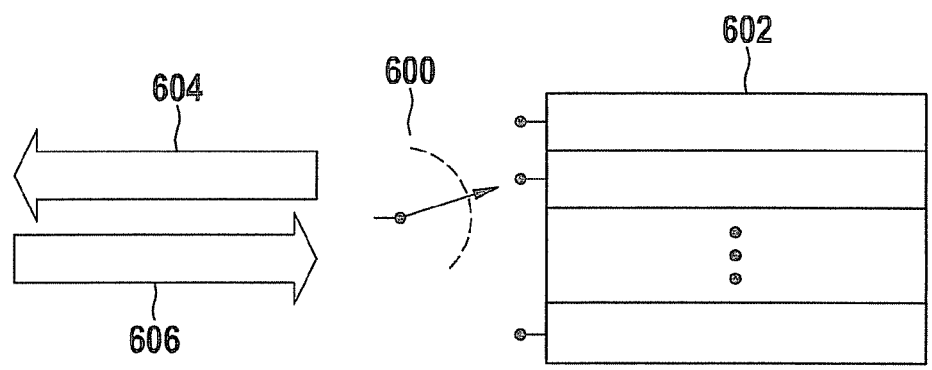
FIG. 18 shows a circuit for exchanging the coefficient sets of the equalizer.

FIG. 18 shows how the appropriate coefficients are alternatingly read from the memory and written back again. In this context, a switch 600 of the equalizer for exchanging the coefficient sets stored in a read-write memory 602 is shown. Therefore, coefficient sets may be read (arrow 604) and written (arrow 606).

For the initialization of the receiver, there are different options for establishing a starting coefficient set at which the adaptation of the equalizer begins. A simple solution is to adapt the equalizer coefficients anew during each operation. Equalizer coefficient sets are not stored. A further option is that the equalizer starts with fixed compromise coefficient sets, which are suitable for a typical channel. In this manner, the adaptation phase may be shortened.

The most rapid adaptation of the equalizer is possible, when the adapted coefficient sets are stored at the end of a transmission and are then available again at the next operation during initialization. As a rule, the changes of the channel are very small and very slow.

In the case of equalizers for use in PSI5 receivers, different fundamental configurations are possible. These mainly differ in the coupling of the equalizer coefficient update to the sampling rate or the received data transmission rate, as well as in the selection of the error signal for the equalizer coefficient update.

The coefficient update of the equalizer may be carried out at the rate of sampling at the ADC, or more slowly, for example, at the rate of the received data symbols.

Figure 19:
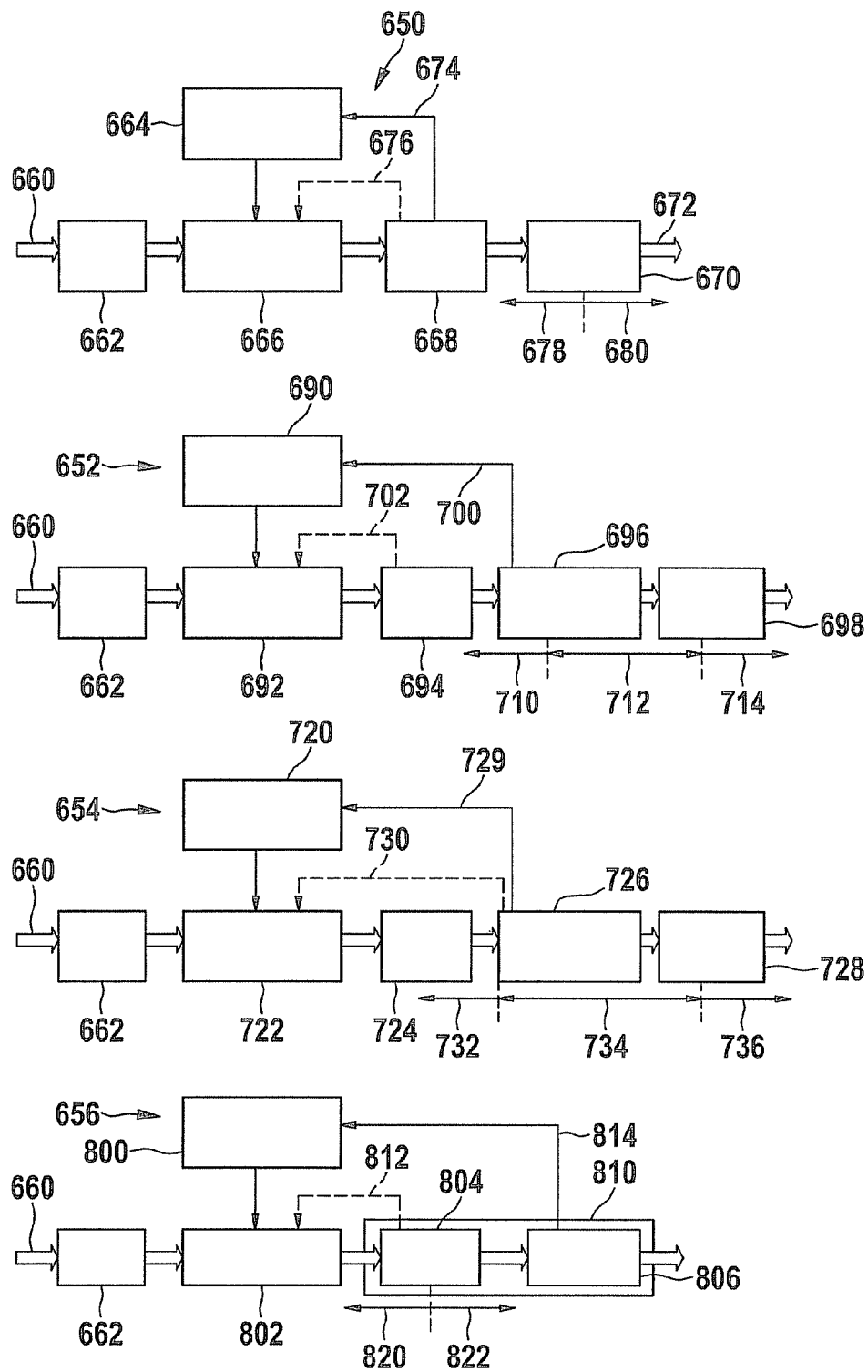
FIG. 19 shows alternative basic configurations of PSI5 receivers having an equalizer.

FIG. 19 shows different configurations of receivers having an adaptive equalizer. In this context, a configuration A 650, a configuration B 652, a configuration C 654 and a configuration D 656 are shown. In all of the configurations, a signal is received 660, which is sampled in an ADC 662. The main difference of these configurations is the division of the receiving circuit into the different clock-pulse domains, in which the signal processing is carried out at the rate of the oversampling (n*symbol transmission rate), in which the signals are processed at the symbol transmission rate; and into the domains, in which the signals are processed at the bit rate. In addition, a filter coefficient setter 664, an adaptive filter 666, a decision device (high/low) 668, and a Manchester decoder 670, which outputs decoded data bits 672, are in configuration A 650.

Decision device 668 outputs an error signal 674 and acquired sampling values (low/high) 676. Delimitation 678 shows the region of the domains of the signal processing that have oversampling (½*n*bit rate=n*symbol transmission rate) and the domains 680 of the signal processing at the bit rate. In block 670, the acquisition of the Manchester symbols, the synchronization in view of the received data symbols, and a decimation are carried out.

In configuration B 652, a filter coefficient setter 690, an adaptive filter 692, a decision device (high/low) 694, a decimation and symbol synchronization unit 696, and a Manchester decoder 698 are shown. In block 696, the signal sampled at a high rate is synchronized with the symbol rate, and the signals are decimated to the symbol transmission rate. An error signal 700 is output at the symbol transmission rate. Decision device 694 outputs acquired sampling values (low/high) 702. Manchester decoder 698 carries out the acquisition of Manchester symbols. An arrow 710 shows the domain, in which the signal processing is oversampled at n*symbol transmission rate, a double arrow 712 shows the domain, in which the signal processing is at the symbol transmission rate, and an arrow 714 shows the domain of the signal processing at the bit rate.

In configuration C 654, a filter coefficient setter 720, adaptive filter 722 of an equalizer (feedforward/feedback), a decision device (high/low) 724, a decimation and symbol synchronization unit 726, and a Manchester decoder 728 are shown. Decimation and symbol synchronization unit 726 outputs an error signal 729 and acquired data symbols (high/low) 730. An arrow 732 shows the domain of the signal processing with oversampling n*symbol transmission rate, a double arrow 734 shows the domain of the signal processing at the symbol transmission rate, and an arrow 736 shows the domain of the signal processing at the bit rate. The Manchester decoder carries out the acquisition of Manchester symbols.

A filter coefficient setter 800, an adaptive filter 802, a decision device (high/low) 804 and a Manchester decoder 806 are included in configuration D 656. Decision device 804 and Manchester decoder 806 form a unit 810, which outputs acquired symbols 812. In addition, Manchester decoder 806 outputs an error signal 814. An arrow 820 shows the domain of the signal processing with oversampling, an arrow 822 shows the domain of the signal processing at the bit rate. In block 810, the acquisition of the Manchester symbols, the synchronization in view of received data symbols, and a decimation are carried out.

Figure 20:
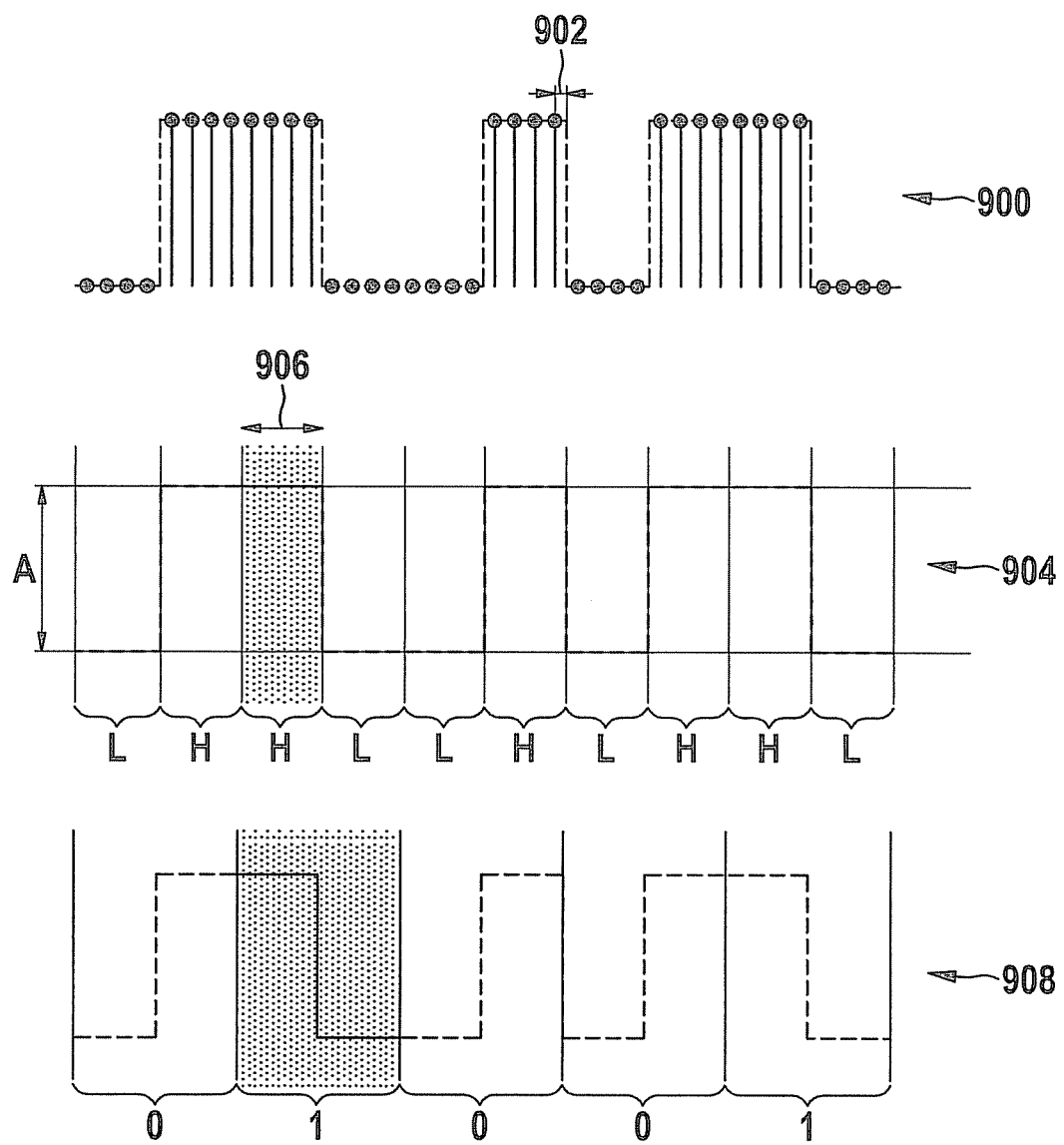
FIG. 20 shows the definition of the sampling intervals, the data symbol intervals and the intervals of the Manchester-encoded bits.

In configuration A 650, the received data are oversampled at the ADC at n times the data symbol transmission rate. FIG. 20 illustrates the relationship of sampling values, data symbols and Manchester-encoded data bits. In the figure, data values 900 are represented at the top. A double arrow 902 illustrates the sampling intervals. Data symbols 904 are shown under them. A double arrow 906 shows the intervals of the data symbols. Finally, the figure shows the Manchester-encoded data bits 908. The figure illustrates three stages, at the rate of which the received signals are processed.

The equalization is carried out on the basis of the data symbols that are sampled n times. The decision device 668 (level high/low) connected in outgoing circuit with the adaptive filter also operates with sample values of n times the symbol transmission rate and generates the error signal for the equalizer coefficient update at this rate.

Manchester decoder 670 receives the sequence of high/low signals sampled n times as an input signal. In Manchester decoder 670, the synchronization with the received data symbols and the decimation to the bit rate now takes place.

If the sampling rate at ADC 662 is sufficiently greater than the symbol transmission rate, then the sampling frequency at ADC 662 does not need to be synchronized with the symbol frequency. However, at a lower sampling rate at ADC 662 (e.g., 2× the symbol transmission rate), a synchronization of the sampling frequency at ADC 662 with the symbol transmission rate is necessary.

Configuration B 652 differs from configuration A 650 in that the data symbols are determined at n times the symbol transmission rate on the basis of the equalizer output signals. Decimation and synchronization with the symbol intervals takes place. Manchester decoder 698 generates the received bit values on the basis of the received data symbols. The equalizer coefficient update may also be carried out at the symbol transmission rate. In contrast to configuration B 652, in configuration C 654, the equalizer having quantized feedback uses the deciding symbols as input signals. Therefore, the feedback filter of the equalizer may operate at the symbol transmission rate or a multiple of it.

In configuration D 656, decision device 804 and Manchester decoder 806 are combined. This combined discriminator and Manchester decoder also generates error signal 814 for the coefficient update of the equalizer.

If an equalizer adapts in the case of a received signal having very little additive interference, then a coefficient set is formed that is optimum for the case of very little interference. However, in the case of such an equalizer coefficient set, additive interference that occurs suddenly may be amplified by the equalizer. In order to prevent additive interference from being amplified by the equalizer, an artificial additive noise may be added to the equalizer adaptation signal. In this case, the equalizer adapts in such a manner, that both the channel distortions and the additive interference are minimized.

Adaptation of the equalizer in the PSI5 receiver is easily possible, using typical, Manchester-encoded PSI5 data frames. Manchester-encoded data have the characteristic, that they have high and low phases in equal portions, which is advantageous for the adaptation of an equalizer.

As an alternative, rapid adaptation of the equalizer may be achieved with the aid of special training signals, which the transmitter transmits at the beginning of a transmission. For example, such a training signal may be made up of a longer sequence of rapidly alternating high and low levels.

What is claimed is:

1. A method for processing signals transmitted via a connection and received by a digital interface, the method comprising:
    transmitting individual data frames by the signals as a sequence of Manchester-encoded modulated symbols; and
    correcting at least some of the received signals with a fractionally-spaced equalizer;
    wherein:
        an adaptation of the fractionally-spaced equalizer is performed only in particular time intervals in a manner controlled by a protocol; and
        the fractionally-spaced equalizer uses at least two sampling values per Manchester half-symbol.

2. The method of claim 1, wherein the adaptation of the equalizer is started and ended by a state machine.

3. The method of claim 1, wherein the signals are transmitted via a point-to-point connection.

4. The method of claim 1, wherein the signals are transmitted via a bus system, and wherein an exchange of coefficient sets of at least one adaptive filter is performed.

5. A digital interface for processing signals, which are transmitted via a connection, comprising:
    a connection arrangement for receiving the signals, wherein individual data frames are transmitted by the signals as a sequence of Manchester-encoded modulated symbols; and
    a fractionally-spaced equalizer configured to sample and correct the received signals;
    wherein:
        an adaptation of the fractionally-spaced equalizer is performed only in particular time intervals in a manner controlled by a protocol; and
        the fractionally-spaced equalizer uses at least two sampling values per Manchester half-symbol.

6. The digital interface of claim 5, wherein the digital interface is configured as an interface for current-modulated or voltage-modulated signals.

7. The digital interface of claim 5, wherein the digital interface can control the data transmission phases of the transmitter using one of trigger signals and synchronization signals, through which the operating states of the fractionally-spaced equalizer can be coupled to the data transmission phases of the transmitter.

8. The digital interface of claim 5, wherein the sequence of the operating states of the equalizer is derived from the data transmission phases of the received signal.

9. The digital interface of claim 5, wherein a state machine provides for the adaptation of the fractionally-spaced equalizer.

10. The method of claim 1, wherein at least one of: (i) the at least some of the received signals are samples of the signals received by the digital interface, the received signals being sampled by a quantizer, and (ii) the equalizer samples the received signals prior to correction.

11. A method for processing signals transmitted by a control unit via a connection and received by a digital interface at at least one peripheral unit, the method comprising:
    transmitting individual data frames by the signals as a sequence of modulated symbols in an asynchronous mode via a point-to-point connection;
    transmitting sync pulses to regulate timing of the individual data frames in a synchronous mode via a bus connection; and
    correcting received signals with a fractionally-spaced equalizer;
    wherein the digital interface conforms to a vehicle bus standard.

12. The method of claim 11, wherein the at least one peripheral unit is one of a sensor and an actuator.

13. The method of claim 1, wherein:
    the signals are transmitted by a control unit;
    the digital interface is to at least one peripheral unit;
    the modulated symbols are transmitted in an asynchronous mode via a point-to-point connection; and
    the method further comprises transmitting sync pulses to regulate timing of the individual data frames in a synchronous mode via a bus connection.

14. The method of claim 13, wherein the at least one peripheral unit is one of a sensor and an actuator.

15. The method of claim 11, wherein the vehicle bus standard is one of: controller area network (CAN), single edge nibble transmission (SENT), and peripheral sensor interface 5 (PSIS).

* * * * *